United States Patent [19]

Mann

[11] Patent Number: 4,715,299
[45] Date of Patent: Dec. 29, 1987

[54] COMPOUND RESOURCE RECOVERY FURNACE

[76] Inventor: Steven L. Mann, P.O. Box 33, Cheshire, Conn. 06410

[21] Appl. No.: 945,013

[22] Filed: Dec. 22, 1986

[51] Int. Cl.$^4$ .............................................. F23G 5/08
[52] U.S. Cl. .................................. 110/235; 110/110; 110/246; 110/248; 110/255
[58] Field of Search ............... 110/235, 246, 248, 255, 110/258, 110

[56] References Cited

U.S. PATENT DOCUMENTS

| | | | |
|---|---|---|---|
| 3,031,144 | 4/1962 | Suga | 110/110 |
| 3,584,609 | 6/1971 | Lerner | 110/246 |
| 3,771,471 | 11/1973 | DuChambon | 110/246 |
| 3,842,762 | 10/1974 | Sargent et al. | 110/246 |
| 3,906,874 | 9/1975 | Janonko et al. | 110/246 |
| 3,938,450 | 2/1976 | Janonko et al. | 110/246 |
| 4,009,667 | 3/1977 | Tyer et al. | 110/110 |
| 4,156,392 | 5/1979 | Bayeh | 110/110 |
| 4,226,584 | 10/1980 | Ishikawa | 110/246 |
| 4,452,152 | 6/1984 | John et al. | 110/235 |

Primary Examiner—Henry C. Yuen
Attorney, Agent, or Firm—McCormick, Paulding and Huber

[57] ABSTRACT

A compound resource recovery furnace having a plurality of furnace chambers including an inner product chamber, an outer incineration chamber, and an intermediate chamber in surrounding relation to the product chamber and within the incineration chamber. The inermediate chamber has a slotted wall made from insulating refractory material and movable damper plates which provide closures for the slots. A temperature responsive control system regulates the damper plates to allow heat to escape from the intermediate chamber to the incineration chamber when the temperature in the incineration chamber drops below a predetermined temperature.

15 Claims, 4 Drawing Figures

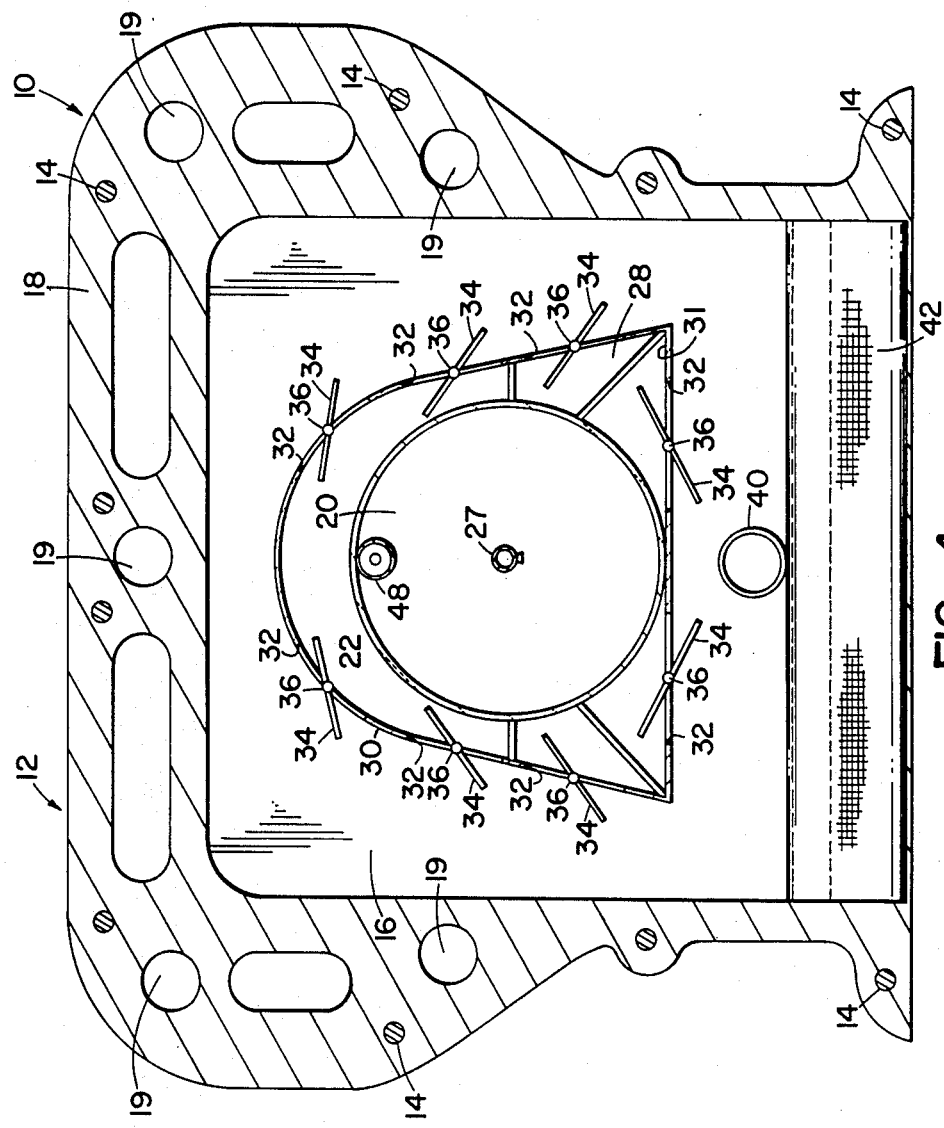

COMPOUND RESOURCE RECOVERY FURNACE

BACKGROUND OF THE INVENTION

This invention relates in general to furnaces and deals more particularly with an improved compound resource recovery furnace having a plurality of furnace chambers. The furnace of the present invention is particularly adapted for reclaim waste materials or processing other materials used in the manufacture of a product while simultaneously serving as an incinerator for disposing of combustible municipal and/or industrial waste materials.

The growing scarcity of land suitable for reclamation by sanitary landfill methods has resulted in an ever increasing demand for improved municipal refuse incineration systems. However, currently available incineration systems are generally quite costly to operate. The combustible waste materials which must be accomodated vary widely in composition and heat content. While combustion may be self-sustaining for some waste materials other materials require considerable auxialiary heat input for sustained combustion. Accordingly, it is the general aim of the present invention to provide an improved compound furnace which utilizes heat output from a material reclaimation or processing operation, as necessary, to sustain combustion in an associated waste material incineration process for disposing of municipal and/or industrial waste materials which may include solid, semisolid and liquid waste materials, which present difficult disposal problems.

SUMMARY OF THE INVENTION

In accordance with the present invention a compound resource recovery furnace is provided which has an elongated outer shell and includes a charging end and a discharging end. An inner chamber assembly is disposed within and extends longitudinally of the outer shell and includes first wall means which defines an inner chamber in communication with the charging and discharging ends. A second wall means surrounds at least a portion of the first wall means and cooperates with the first wall means to define an intermediate chamber. The outer shell cooperates with said first chamber assembly to define an outer chamber. A means is provided for heating the inner chamber. Regulating means associated with the second wall means controls communication between said intermediate chamber and said outer chamber. A controlling means responsive to temperature within the outer chamber operates the regulating means to vary the degree of communication between said intermediate chamber and said outer chamber whereby temperature within said outer chamber may be altered.

BRIEF DESCRIPTION OF THE DRAWINGS

FIG. 4 is a somewhat schematic sectional view taken generally along the line 4—4 of FIG. 2.

DETAILED DESCRIPTION OF PREFERRED EMBODIMENT

Figure 1:
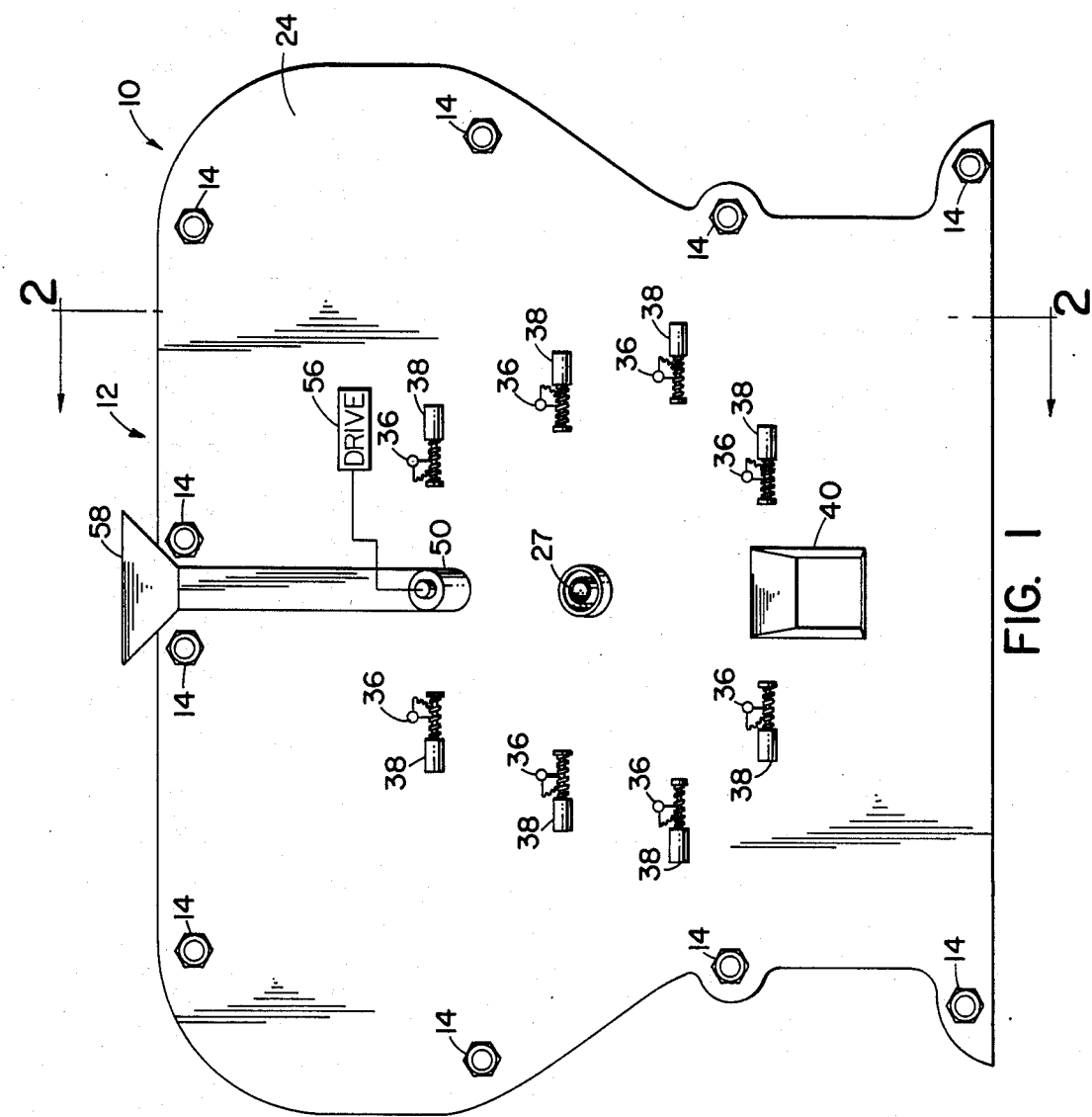
FIG. 1 is an end elevational view of the charging end of a compound resource recovery furnace embodying the present invention.

Turning now to the drawings, a compound resource recovery furnace embodying the present invention and shown somewhat schematically is indicated generally by the reference numeral 10. The illustrated furnace 10 is particularly adapted for use in the production of a product or products while simultaneously serving as an incinerator for municipal and/or industrial waste materials including solid, semi-solid or liquid waste materials which present difficult disposal problems.

The furnace 10 has an outer shell, indicated generally at 12, which may vary in length and which is preferably formed from a plurality of cast metal shell sections (not shown) secured together in a conventional manner by a plurality elongated tie bolts 14,14 or the like. The shell sections cooperate in assembly to partially define an outer combustion chamber or incineration chamber 16 and a steam jacket 18 which surrounds the incineration chamber 16 and contains a plurality of connected fluid passageways, such as indicated at 19,19 in FIGS. 2 and 4.

Figure 2:
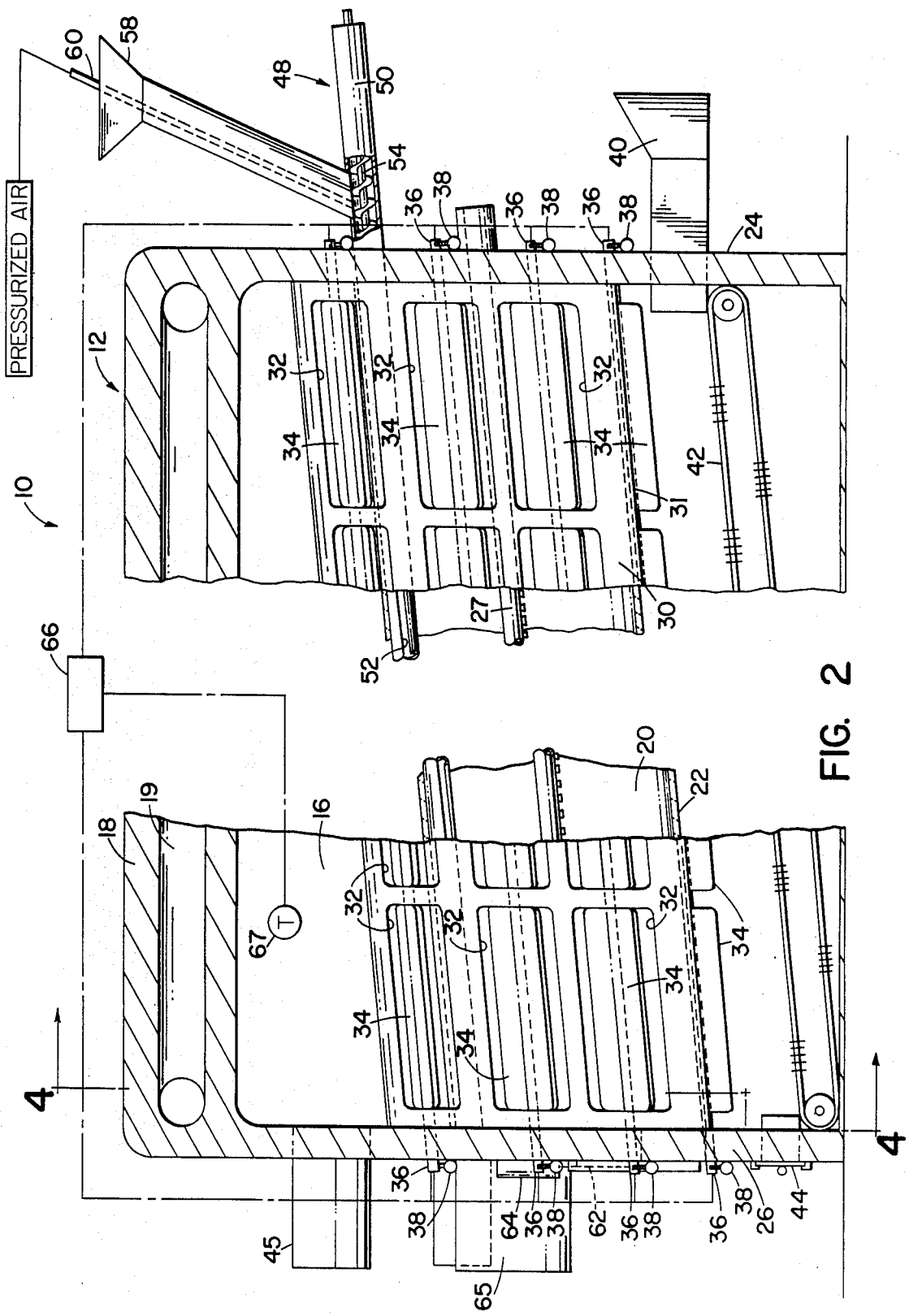
FIG. 2 is a somewhat schematic fragmentary longitudinal sectional view through the furnace taken generally along the line 2—2 of FIG. 1.
Figure 3:
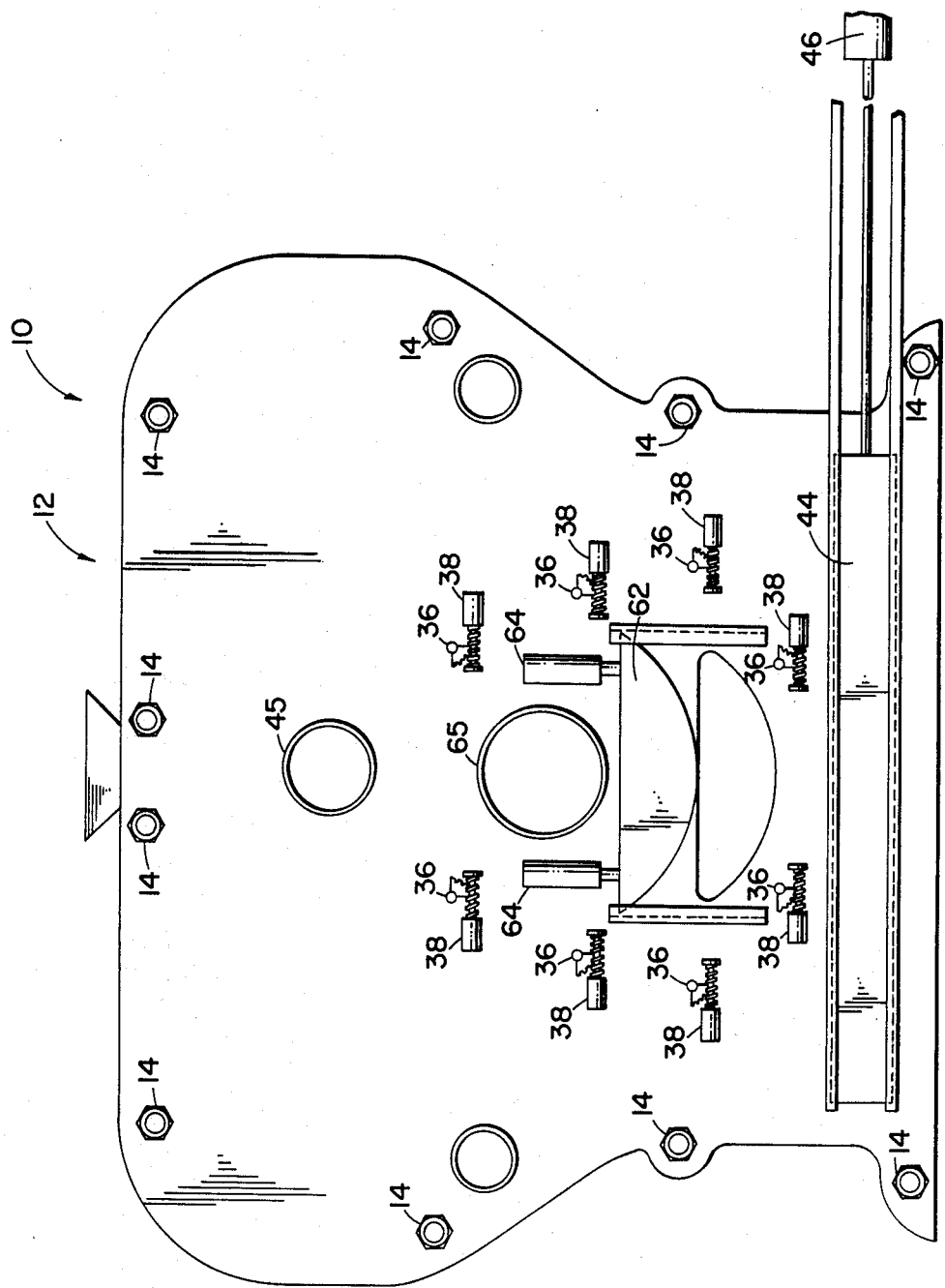
FIG. 3 is an end elevational view of the discharging end of the furnace.

In accordance with the invention, a core or inner combustion chamber 20 is disposed within the outer chamber 16. In the illustrated embodiment 10 the inner chamber extends longitudinally of the furnace between the furnace shell end walls 24 and 26. The cross-sectional shape of the inner chamber 20 may vary, but preferably, and as shown, the inner chamber 20 has a generally circular cross-section and is formed by a cylindrical tubular first wall 22 of heat conductive material capable of withstanding high heat. The first wall 22 is preferably axially downwardly inclined from the front end wall 24 at the charging end to the rear end wall 26 at the discharging end of the furnace, as best shown in FIG. 2.

One or more heating units, such as oil fired burners or natural gas burners, for example, are located within or otherwise associated with the inner chamber 20 for heating the inner chamber to a predetermined operating temperature, as will be hereinafter discussed. In the drawings a natural gas burner manifold for heating the chamber 20 is shown somewhat schematically and indicated by the reference numeral 27. One or more temperature sensing devices (not shown) located within the inner combustion chamber 20 may be utilized to control operation of the burner unit or units associated with the manifold 27 to maintain a predetermined temperature within the inner chamber 20.

Further, and in accordance with the invention, an intermediate chamber 28 is arranged within the outer combustion chamber 16 and in generally surrounding spaced relationship with at least a portion of the inner chamber 20. In the presently preferred embodiment of the invention the intermediate chamber 28 is partially defined by a second wall 30 which extends generally longitudinally of the furnace and in general axial alignment with the inner chamber 20 between the furnace end walls 24 and 26. The cross-sectional shape of the second wall 30 may vary, but preferably and as best shown in FIG. 4, the second wall 30 has a substantially flat bottom wall portion indicated by the numeral 31.

The second wall 30 preferably comprises a refractory material capable of withstanding high temperatures, as for example, temperatures in excess of 3000 degrees fahrenheit, while providing a high degree of insulation for heat retention within the intermediate chamber 28, as required, for a purpose which will be hereinafter further evident. The refractory material may, for example, comprise a coating applied to a metal substrate which imparts a required degree of structural integrity to the wall 30. A ceramic material is preferably utilized in fabricating the second wall 30. PYRO CERAM, a material manufactured by Corning Glass Works, Paden City, W.V., is believed to be particularly suitable for this purpose and presently preferred for use in the fabrication of the second wall 30.

A plurality of apertures or longitudinally extending slots 32,32 open through the second wall 30 and provide communication between the outer combustion chamber 16 and the intermediate chamber 28. Each slot 32 has an associated closure or damper plate 34 supported relative to it for movement through a range of positions between a fully open position wherein maximum communication is provided through the slot 32 between the main combustion chamber 16 and the intermediate chamber 28 and a closed position wherein the slotted opening between the two chambers is blocked by its associated damper plate 34. The damper plates 34,34 are preferably constructed of a suitable low heat transfer material to provide a high degree of heat retention within the intermediate chamber when the dampers are in closed positions.

In the illustrated embodiment each damper plate 34 is supported by an associated pivoted rod 36 which extends outwardly through one or both ends of the furnace outer shell 12. A servo motor 38 associated with each rod 36 operates a worm and gear drive mechanism which rotates the rod about its axis to move the damper plate or plates carried by the rod between open and closed positions, as desired. The servo motors 38,38 may be arranged at one or both ends of the furnace 10 to operate independently of each other or in unison, as may be required to maintain a desired temperature condition within the furnace 10, as will be hereinafter further discussed.

A movable grate 42 is located in the lower portion of the incineration chamber 16 below the intermediate chamber 28 for receiving waste material and conveying it through the incineration chamber as it is incinerated. The illustrated grate 42 is inclined from the charging toward the discharging end of the furnace 10 and is disposed below and preferably in generally parallel relation to the bottom wall portion 31, substantially as shown in FIG. 2.

The arrangement for feeding combustible waste material into the incineration chamber 16 may vary and will be generally determined by the nature of the waste material to be incinerated. In FIGS. 1 and 2 a trash stoker at the charging end of the incinerator is shown somewhat schematically and indicated by the numeral 40. Where the waste materials to be burned essentially comprise solid material the stoker 40 may comprise a ram or pusher mechanism for charging the outer combustion chamber or incinerator 16. However, an augur feed device may be preferred when the combustible refuse is comprised largely of semi-solid material, sludge or the like. A sliding ash removal door 44 located at the discharge end 26 and operated by a fluid motor or hydraulic cylinder 46 facilitates ash removal from the outer chamber 16. A smoke outlet 45 is also provided which communicates with the upper portion of the chamber at the discharge end of the furnace.

The illustrated compound furnace 10 may be used for any purpose for which a furnace of this type is required, but preferably it is utilized to reduce solid materials to a molten state for use in the manufacturer of a product such as glassware, for example. In accordance with the present invention a feeding mechanism indicated generally at 48 is provided for introducing a charge of dry granular material, such as used in the manufacture of glass, into the inner chamber 20 at a substantially uniform rate along the entire length of the chamber 20. The illustrated feeding mechanism 48 comprises an auger feed mechanism and includes an elongated feed tube 50 which extends axially into the chamber 20 from the charging end of the furnace and along substantially the entire length of the chamber 20. An elongated helical slot 52 formed in the feed tube 50 extends longitudinally of the tube along substantially entire length of the portion of the tube contained within the furnace chamber 20. The helical slot 52 has its highest point located near the furnace inlet or charging end 24 and its lowest point located near the furnace discharging end 26 and subtends not more than one half convolution. An elongated augur or feed screw 54 is supported for coaxial rotation within the feed tube in response to operation of an associated drive mechanism 56. A feed hopper 58 is provided for directing material into the feed tube, substantially as shown in FIG. 2. Preferably, and as shown, an air manifold 60 is located within the feed hopper 58 through which air under pressure may be introduced at various points along the manifold and within the hopper to aid in maintaining a flow of material from the hopper into the feed tube 50.

A vertically sliding breach door 62 operated by fluid or hydraulic motors 64,64 is located at the discharged end 26 for controlling flow of molten material from the inner chamber 20 to other apparatus (not shown) used in further processing the molten material. A smoke outlet 65 is also provided which communicates with the discharge end of the chamber 20.

Further, and in accordance with the present invention, a means is provided for controlling temperature within the incineration chamber 16 to maintain a desired temperature therein. The temperature control means may, for example, comprise one or more temperature sensing devices such as the sensing device 67 located within the outer chamber 16. A control means 66 responsive to a predetermined temperature detected by the sensing device 67 controls the operation of the various servo motors 38,38 to regulate the damper plates 34,34 to vary the degree of communication between the intermediate chamber and the outer chamber and control escape of hot gases from the intermediate chamber 28 to the outer chamber 16 to effect a change in temperature within the outer or incineration chamber 16.

When the incinerator 10 is utilized to produce a product such as glass, for example, culet or broken waste glass, silica, and soda, added in the form of sodium carbonate or nitrate, to lower the melting temperature of the silica, is fed from the hopper 58 to the augur 54. The air manifold 60 disposed within the feed hopper 58 produces sufficient agitation of the material within the hopper to assure continuous movement of the material into the feed tube wherein it is advanced by the auger 54 into the chamber 20. The arrangement of the elongated helical slot enables a charge of raw materials to be introduced into the chamber 20 simultaneously along substantially the entire length of the chamber and at a relatively uniform rate as the feed screw 54 advances the charge within the feed tube.

In a glass manufacturing process, for example, the inner chamber 20 is preferably heated to and maintained at a temperature of approximately 3000 degrees fahrenheit by operating the heating unit or units associated with the inner chamber. Since the first wall 22 is adapted to conduct heat, a halo of hot gases at a temperature of approximately 2800 degrees may be maintained within the intermediate chamber 28. A temperature of approximately of 1800 degrees fahrenheit is preferably maintained in an outer or incineration chamber 16. Auxiliary burners (not shown) may be provided in the outer chamber to assist in starting the furnace, however, the incineration chamber may also be preheated by first bringing the inner chamber 20 up to its normal operating temperature and then opening various damper plates 34,34, as necessary, to release hot gases from the intermediate chamber 28 to the outer chamber 16. Suitable means (not shown) will, of course, be provided for introducing oxygen into the various furnace chambers as required to sustain combustion.

Trash to be incinerated is simultaneously introduced into the incineration chamber 16 by the feed mechanism 40. Each charge of trash is conveyed from the charging end toward the discharging end of the furnace by the movable grate 42, which, as shown, comprises a continuous belt conveyor.

When the waste material to be incinerated is of nonuniform composition, the heat content of the material will, of course, vary. Some of the waste materials may sustain combustion at temperatures well below the 1800 degree halo temperature in the outer chamber 16. However, when waste materials which are difficult to burn are introduced into the incinerator the temperature within the outer chamber 16 will tend to drop, causing the sensing device 67 within the later chamber to detect the change in temperature and send a signal to the control means 66 calling for additional heat. The servo motors 38,38 operate in response to the control apparatus 66 causing one or more of the dampers 34,34 associated with the intermediate chamber 28 to open thereby releasing heated gas from the intermediate chamber into the outer chamber 16 to restore the predetermined operating temperature in the outer chamber.

Further control may be attained to maintain the furnace at peak efficiency by proper planing. The incineration chamber 16 may, for example, be charged with a batch of waste material having high heat content and which will readily sustain combustion during the period when the product chamber 20 is being discharged, thereby reducing, if not substantially eliminating, the need for addition of heat to the incineration chamber while the product furnace is being unloaded. Conversely, the charge within the product chamber 20 may be held within the product chamber while waste material which is difficult to incinerate at lower temperatures is introduced into the incinerator, thereby reducing the heat input requirements of the product chamber while the incineration chamber is operating to incinerate the later batch of material. The speed at which burning trash is moved through the incineration chamber 16 may also be programed to coordination with other controllable variables hereinbefore discussed to attain peak operating efficiency.

I claim:

1. A compound furnace comprising an elongated outer shell having a charging end and a discharging end, an inner chamber assembly disposed within and extending longitudinally of said shell and including first wall means for defining an inner chamber in communication with said charging end and said discharging end and second wall means surrounding at least a portion of said first wall means for cooperating with said first wall means to define an intermediate chamber, said outer shell cooperating with said inner chamber assembly to define an outer chamber, means for heating said inner chamber, regulating means associated with said second wall means for controlling communication between said intermediate chamber and said outer chamber, and controlling means responsive to temperature within said outer chamber for operating said regulating means to vary the degree of communication between said intermediate chamber and said outer chamber whereby to alter temperature within said outer chamber.

2. A compound furnace as set forth in claim 1 wherein said second wall means comprises a wall of refractory material.

3. A compound furnace as set forth in claim 2 wherein said refractory material comprises ceramic material.

4. A compound furnace as set forth in claim 1 wherein said second wall means comprises PYRO CERAM.

5. A compound furnace as set forth in claim 1 wherein said second wall means comprises insulating material.

6. A compound furnace as set forth in claim 1 wherein said regulating means comprises at least one opening in said second wall means and a damper plate supported for movement through a range of positions between open and closed positions relative to said one opening.

7. A compound furnace as set forth in claim 6 wherein said regulating means further includes a servo motor mounted externally of said furnace and operably connected to said one damper plate for moving said one damper plate in response to signals received from said controlling means.

8. A compound furnace as set forth in claim 1 including charging means at the charging end of said furnace for receiving a charge of material and delivering said charge of material to said inner chamber at a substantially uniform rate of delivery along a substantially portion of the axially length of said inner chamber.

9. A compound furnace as set forth in claim 8 wherein said charging means comprises an auger feed mechanism.

10. A compound furnace as set forth in claim 9 wherein said auger feed mechanism comprises an elongated feed tube having a generally cylindrical wall and extending in axial direction into said inner chamber and having an elongated outwardly open generally helical slot through said cylindrical wall and communicating with the interior of said feed tube, said slot having its highest point near the charging end of said inner chamber and having its lowest point near the discharging end of said inner chamber, said slot forming less than one convolution about the axis of said feed tube, an auger supported for coaxial rotation within said feed tube, and drive means for rotating said auger within said feed tube.

11. A compound furnace as set forth in claim 1 wherein said outer shell comprises a steam jacket having at least one fluid passage way therethrough.

12. A compound furnace as set forth in claim 1 wherein said inner chamber is axially downwardly inclined from said charging end toward said discharging end.

13. A compound furnace comprising an elongated outer shell haing a charging end and an discharging end, a first wall extending longitudinally of said furnace within said shell between said charging end and said discharging end and cooperating with associated portions of said shell to define an inner chamber, a second wall made from refractory material disposed in generally axially surrounding relation to said first wall and extending between said charging end and said discharging end of said shell, said second wall cooperating with said first wall and associated portions of said shell to define an intermediate chamber, said second wall cooperating with said outer shell to define an outer chamber, said second wall having a plurality of openings therethrough providing communication between said intermediate chamber and said outer chamber, a plurality of damper plates equal in number to said openings, each of said damper plates being supported relative to an associated one of said openings for movement between open and closed positions relative to said one openings, means for delivering a charge of material to be processed to said inner chamber, means for delivering a charge of material to be incinerated to said outer chamber, means for heating said inner chamber, a plurality of servo motors for moving said damper plates, and controlling means responsive to temperature in said outer chamber for operating said servo motors to vary the positions of said damper plates relative to said openings whereby to alter temperature within said outer chamber.

14. A compound furnace as set forth in claim 13 wherein said second wall comprises PYRO CERAM.

15. A compound furnace as set forth in claim 13 wherein said second wall has a substantially flat bottom portion and at least some of said openings are located in said bottom portion and said furnace includes movable grate located within a lower portion of said outer chamber below said bottom portion for conveying a charge of material to be incinerated from said charging end to said discharging end.

* * * * *